Dec. 31, 1968 W. STRAUSS 3,418,694
APPARATUS SCRAP GRINDER AND PLASTIC INJECTION MOLDING MACHINE
Filed Sept. 30, 1966
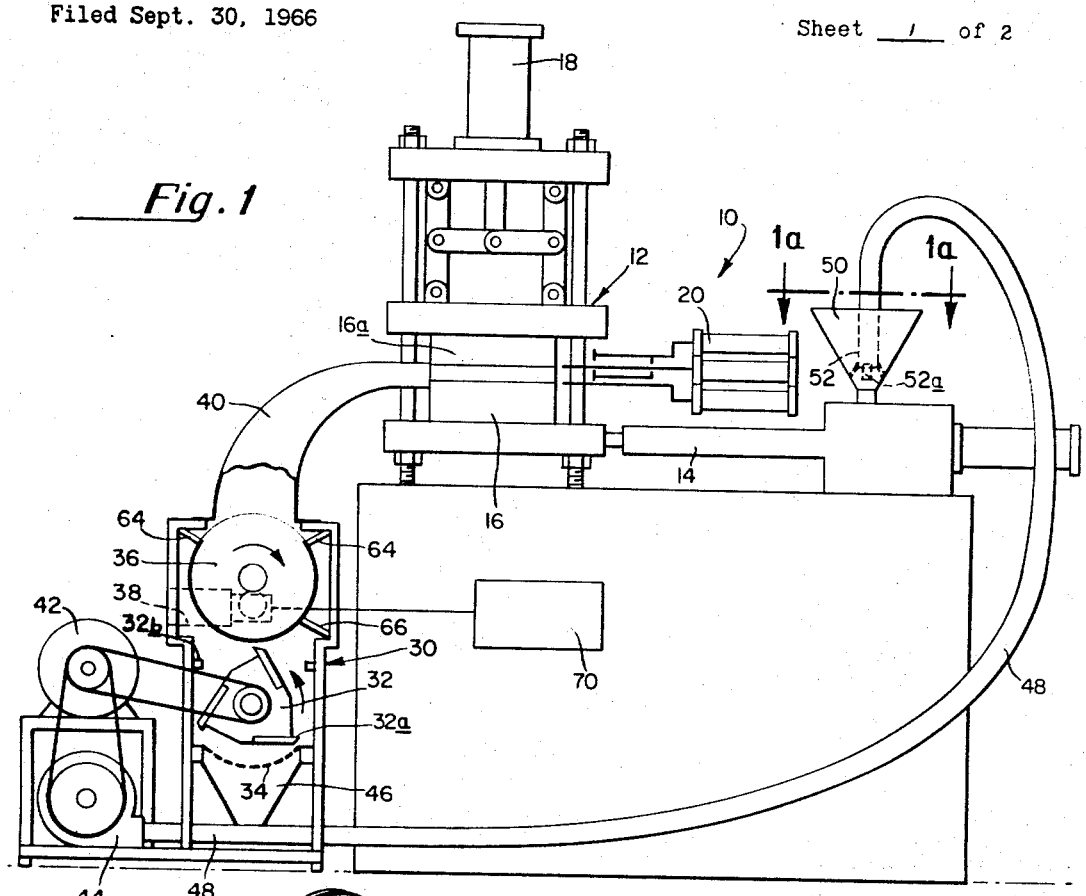
Fig. 1
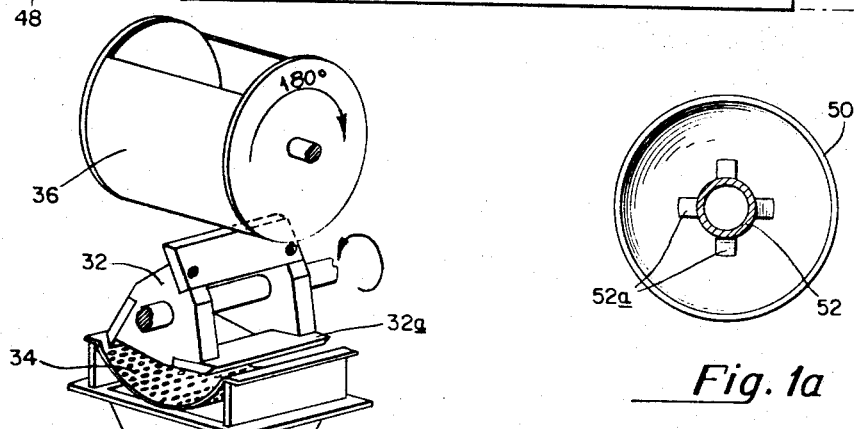
Fig. 4
Fig. 1a
INVENTOR.
WILLIAM STRAUSS
BY 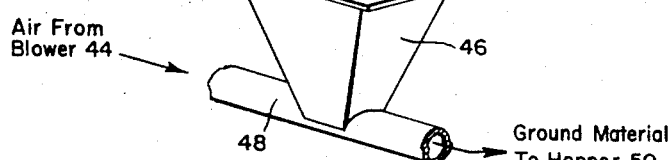
ATTORNEY.

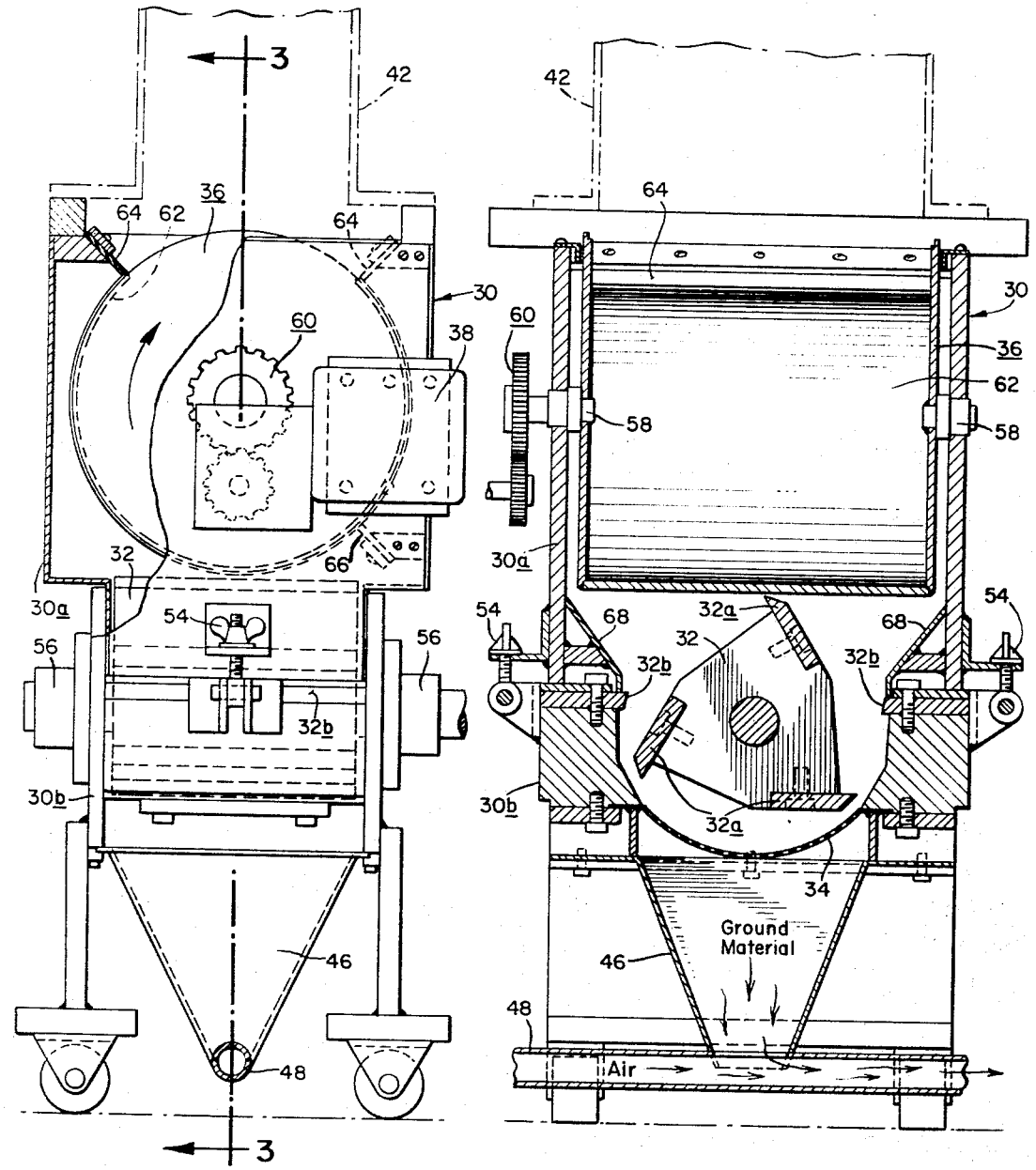

3,418,694
APPARATUS SCRAP GRINDER AND PLASTIC INJECTION MOLDING MACHINE

William Strauss, Huntingdon Valley, Pa., assignor to Pennsalt Chemicals Corporation, Philadelphia, Pa., a corporation of Pennsylvania
Filed Sept. 30, 1966, Ser. No. 583,221
10 Claims. (Cl. 18—30)

ABSTRACT OF THE DISCLOSURE

Scrap grinding apparatus for continuously comminuting plastic scrap discharged from an injection molding machine and feeding comminuted scrap to the inlet port of the injection cylinder. A gate interposed in the conduit leading to the separable molds dispenses the scrap to the comminutor at predetermined intervals but always obstructs and prevents dust and hard particles produced during comminution from returning through the conduit to the molds so as to avoid fly-back.

---

This invention relates to a grinder for scrap from a plastic injection molding machine. More specifically this invention relates to a compact grinder adapted to comminute runners, sprues, flashing and other scrap plastic from and providing fool-proof means for avoiding "fly-back" from the grinder to the mold.

In the prior art it has been common to comminute the scrap from the plastic molding operation and to feed the scrap back into the injection molding extrusion cylinder along with virgin plastic. Disclosures of such arrangements are found in U.S. Patents 2,995,775 and 3,000,055. These former devices, however, did not present a compact arrangement which precluded any possibility of the projection of scrap back into the mold cavity. It is well known that the presence of cured hardened scrap in the die cavity could damage the dies. As a secondary point, because there has been a possibility of such "fly-back," there has not been assurance of the delivery of a uniform amount of scrap plastic regrind to the machine inlet for each press cycle. As a result the composition of the product discharged from the press has not been uniform and in some cases has occasionally not met specifications.

It is, therefore, an object of the present invention to provide a compact grinder with a fool-proof system for the avoidance of "fly-back" from the grinder to the mold.

It is a further object to assure that a uniform dose of plastic regrind is delivered to the injection molding machine for each cycle.

Further objects of the invention will be clear from reference to the attached specification, including drawings wherein:

FIGURE 1 is a partly schematic and simplified view showing an apparatus embodying the invention;

FIGURE 1a is a fragmentary enlarged sectional view taken on the line 1a—1a of FIGURE 1;

FIGURE 2 is a partly sectional enlarged end view of the grinder of FIGURE 1;

FIGURE 3 is a partly sectional side view of the apparatus of FIGURE 2; and

FIGURE 4 is a very schematic view showing the orientation between the metering means and the comminutor of the apparatus of the figures.

Briefly, the invention involves an apparatus for grinding scrap plastic from an injection molding machine. The operation of the grinder assures the avoidance of "fly-back" into the mold and it assures the feed of a predetermined dose of ground plastic to the placsticizing portion of the molding machine.

Referring more specifically to the invention, an arrangement including an apparatus embodying the invention is shown in FIGURE 1 and is generally designated 10. The figure shows an injection molding machine 12 which may be of the reciprocating in-line screw type having extrusion cylinder 14 and a separable mold 16 and 16a adapted to be opened and closed by power means 18. Stripper means 20 removes the product from the mold once the mold is open and separately discharges the scrap and the desired product. Power means drive the stripper means in an arrangement well known in the art.

Disposed adjacent the injection molding machine is the scrap grinder 30 which includes a rotary comminutor 32 with blades 32a and having an outlet screen 34 and a closed housing with fixed blades 32b. "Fly-back" shielding means in the embodiments shown comprise a rotary drum 36 which is disposed above the inlet of the rotary comminutor 32. In the embodiment shown, the metering drum 36 is adapted to be driven by a motor 38 mounted on the side of the grinder housing. The drum receives the scrap directly from the mold through the scrap chute 40.

A motor 42 is, in the embodiment shown, disposed adjacent the grinder and powers the comminutor 32. It also drives the blower 44 disposed thereunder. The blower generates air pressure to convey ground scrap received from funnel 46 beneath the screen 34, through the conduit 48 up to the hopper and inlet port 50 of the injection molding machine. The end 52 of the conduit 48 is held deeply in the hopper 50 by arms 52a so that the discharge from the conduit 48 is delivered directly into the machine feed port along with virgin material in uniform proportions cycle after cycle.

Control means 70, indicated schematically, controls the sequence of operation of the various elements of the injection molding machine and is connected to the motor 38 to drive the metering drum 36 at the appropriate time.

The more detailed views of the grinder in FIGURES 2 and 3 indicate that the housing of the grinder 30 is separable above the comminutor 32, the upper portion 30a being held down against the lower portion 30b by the wing bolts 54 as shown. This separability permits access to the comminutor chamber.

As shown, the rotor 32 is journaled at 56 in the opposite side walls of the lower portion 30b of the housing. The lower portion of the housing may be on wheels for mobility as shown.

The drum 36 (FIGURE 3) is journaled for rotation at 58 in the upper end 30a of the grinder. It is powered by motor 38 through a gear train represented generally by 60. The metering drum is provided with a pocket 62 to receive the scrap from chute 40. Rubber guards 64 funnel the scrap into the pocket. As will be understood the drum rotates, from the position shown in FIGURE 2, 180° in a clockwise direction to face downwardly into the rotor 32 and discharge its dose of scrap at the appropriate time. The guard 66 disposed in the lower right-hand corner of the metering drum housing as well as the right-hand guard 64 serve to keep scrap being ground by the rotor 32 from being thrown upwardly by the comminutor past the mouth 62 at the time when the mouth faces right as shown in FIGURE 2. This precludes "fly-back" of large scrap parts.

The sloping surfaces 68 disposed in the lower end of the metering housing funnel the scrap dose into the chamber of the rotor 32.

In operation the metering drum 36 faces upwardly to receive the scrap as it is ejected from the mold by stripper 20 and slides down chute 40. Thereafter as the press closes the control means 70 causes the motor 38 to rotate the drum 180° clockwise so that the pocket 62 faces downward and the scrap dose is delivered to the comminutor chamber. Because of the guards 64 and 66 no scrap can be thrown up from the comminutor chamber by the rotor 32. As the ground plastic passes through the screen 34 it is directly delivered through conduit 48 to the hopper 50 adjacent the extrusion cylinder inlet port. Because of the positioning of the discharge end 52 of the conduit 48 adjacent the port, the regrind is used on the next cycle of injection along with virgin material surrounding the conduit 48 in the hopper 50. This assures immediate, and therefore proportional, feed back of regrind into the molding machine.

The control means 70 then actuates the return of the metering drum to the original position with the mouth 62 thereof facing upwardly to receive the next dose of scrap.

The comminutor rotor 32 and blower 44 operate continuously.

It should be noted that because of the rapid rotation of the rotor 32 there is some danger that some scrap could escape from the comminutor chamber. It is important that there be no escape because such "fly-back" of hard plastic in the mold cavity, could, on the next cycle cause virtual destruction of the mold. The avoidance of such an occurrence is a primary objective of this invention. Further, the amount of scrap delivered to the hopper 50 for each cycle must be uniform. To avoid the escape of such "fly-back" the metering drum 36 serves as a guard over the upper end of the comminuting chamber irrespective of whether the drum 36 is facing up or down.

The tube 48 may be vented near the end 52 so that the blast of air coming therefrom will not overly disturb the plastic in the hopper 50.

Fail safe means connecting the shielding drum drive 38 and the press may be provided whereby an alarm is actuated if after a given time after the drum starts to rotate from its upward-facing position, it does not reach its downward-facing position. This could signal, for instance, the failure of motor 38.

It should be understood that while the embodiment shown is preferred, variations of the invention are possible. For instance, it would be possible to time the operation of the metering drum 36 so that it delivers plastic scrap to the comminutor chamber at some time other than as the press is closing. It is an essential of the invention, however, that the shelding means avoid "fly-back" and deliver a uniform dose of scrap to the comminuting chamber once each press cycle.

The present invention may thus be embodied in other specific forms without departing from the spirit or central attributes thereof and, accordingly, reference should be made to the appended claims rather than the foregoing specification as indicating the scope of the invention.

I claim:

1. For an injection molding machine having a two-piece mold, means adapted to open and close the mold, and a feed port for introduction of plastic to be plasticized; a scrap grinder comprising:
    (a) a rotary comminutor having an inlet opening at its upper end,
    (b) a drum housing mounted over and having its lower end communicating with the inlet of said comminutor and terminating upwardly in a mouth,
    (c) a shielding drum mounted in said housing between the month and the comminutor inlet for rotation about a horizontal axis, said drum having a pocket therein for the receipt of plastic scrap while the pocket is at a first station where it faces upwardly in the mouth, the pocket adapted to discharge such scrap into the comminutor when the pocket is at a second station where it is facing downward toward the comminutor,
    (d) means to rotate the drum to move the pocket from the first station to the second station and to the first station again, and
    (e) conveyor means adapted to convey comminuted scrap from the comminutor to the feed port of the injection molding machine.

2. A scrap grinder as described in claim 1 wherein the means to rotate the drum moves the pocket from the first station to the second station while said means adapted to open and close the mold is closing the mold.

3. A scrap grinder as described in claim 1 wherein the means to rotate the drum moves the pocket from the second station to the first station so that the pocket is at the first station during part of the time that the mold is open.

4. A scrap grinder as described in claim 1 wherein means are provided to actuate a signal if by a given time after the drum is actuated from its first station it does not reach its second station.

5. Scrap grinding apparatus comprising conduit means for receiving plastic scrap discharged from separable molds of an injection molding machine, comminuting means for grinding said plastic scrap and coupled with said conduit means, conveying means for feeding ground scrap from said comminuting means to the inlet of an injection cylinder, and gating means interposed between said conduit means and said comminuting means for dispensing scrap to said comminuting means at predetermined intervals while constantly blockading and preventing any return therefrom of any particles of hardened scrap or dust to the molds through said conduit means whereby fly-back is avoided.

6. The apparatus of claim 5 wherein said gating means is rotary.

7. The apparatus of claim 6 including a pocket in said gating means normally disposed in an upright position for receiving scrap from said conduit, and means for rotating said gating means through 180° so as to invert said pocket and discharge the contents thereof into said comminution means.

8. The apparatus of claim 7 including means for actuating a signal when said means for rotating does not invert said pocket from a receiving to a discharging position within a predetermined period of time.

9. The apparatus of claim 5 wherein said conduit means comprises a closed channel.

10. The apparatus of claim 9 wherein said conveying means is pneumatic.

References Cited

UNITED STATES PATENTS 2,531,524  11/1950  Nichols et al.
2,995,775  8/1961  Schnitzius et al.
3,000,055  9/1961  Schlicksupp.

WILBUR L. McBAY, *Primary Examiner.*

U.S. Cl. X.R.

83—914; 264—37